United States Patent [19]
McAteer et al.

[11] Patent Number: 5,369,701
[45] Date of Patent: Nov. 29, 1994

[54] COMPACT LOUDSPEAKER ASSEMBLY

[75] Inventors: Jeffrey P. McAteer, Fishers; Kevin D. Willis, Indianapolis, both of Ind.

[73] Assignee: AT&T Corp., Murray Hill, N.J.

[21] Appl. No.: 967,340

[22] Filed: Oct. 28, 1992

[51] Int. Cl.⁵ .................. H04M 1/00; H04R 25/00
[52] U.S. Cl. .................. 379/420; 379/428; 379/429; 381/159
[58] Field of Search ........... 379/432, 420, 433, 429, 379/428; 381/188, 205, 152, 154, 159

[56] References Cited

U.S. PATENT DOCUMENTS

| | | | |
|---|---|---|---|
| 2,542,922 | 2/1951 | Giannini | 379/432 |
| 4,375,584 | 3/1983 | Muzumdar et al. | 379/428 |
| 4,451,711 | 5/1984 | Jackson | 381/159 |
| 4,727,583 | 2/1988 | Weber | 381/90 |
| 4,837,837 | 6/1989 | Taddeo | 381/159 |
| 4,885,773 | 12/1989 | Stottlemyer et al. | 379/420 |
| 4,937,877 | 6/1990 | Pocock et al. | 381/158 |
| 5,121,426 | 6/1992 | Baumhauer, Jr. et al. | 379/388 |
| 5,201,069 | 4/1993 | Barabolak | 381/188 |
| 5,274,701 | 12/1993 | Schmidt et al. | 379/429 |

FOREIGN PATENT DOCUMENTS

| | | | |
|---|---|---|---|
| 4117598 | 12/1992 | Germany | 379/432 |
| 126355 | 7/1984 | Japan | 379/420 |

*Primary Examiner*—James L. Dwyer
*Assistant Examiner*—Jack Chiang
*Attorney, Agent, or Firm*—Michael A. Morra

[57] ABSTRACT

A speakerphone comprises an upper housing member and a lower housing member that are joined together to enclose a loudspeaker, a microphone, and a printed wiring board having electronic components mounted thereon that cooperate in the operation of the speakerphone. The upper housing member includes a continuous sidewall that is molded into its underside and extends downwardly toward the printed wiring board. The sidewall surrounds a group of sound apertures that are also molded into the upper housing member. A loudspeaker is attached to the underside of the upper housing member in such a manner that it completely covers the sound apertures. A sealed enclosure within the speakerphone is formed by creating a seal between the sidewalls and the printed wiring board. A compliant gasket is illustratively used to create the seal. As a result, the frequency response of the loudspeaker is improved, and acoustic coupling between the loudspeaker and the microphone is reduced. The frequency response of the loudspeaker is further improved by inserting acoustically absorbent material, and by extending a tuned port, into the sealed enclosure.

13 Claims, 3 Drawing Sheets

COMPACT LOUDSPEAKER ASSEMBLY

TECHNICAL FIELD

This invention relates to the design of loudspeaker housings, and more particularly to improvements in their frequency response.

BACKGROUND OF THE INVENTION

Loudspeaking telephone stations, also known as "speakerphones" or "hands-free" telephones, combine a loudspeaker and a microphone within a single enclosure to enable a user to participate in a telephone conversation without having to hold a handset against her/his face. It is well known that a loudspeaker requires a sealed enclosure or back cavity to achieve a smooth frequency response. This is due to the 180° phase difference between sound radiated from the front and back side of the loudspeaker cone. To avoid undesirable interaction between these sound waves, the notion of an infinite baffle was created. An infinite baffle is simply a rigid plane that extends for an infinite distance in all directions separating the front and back sides of a loudspeaker. Since sound waves cannot pass through or go around such a plane, sounds coming from the back side of the loudspeaker are precluded from interacting with sounds coming from the front side thereof. Despite the obvious simplicity and elegance of an infinite baffle, engineers with limited imagination have declared it to be impractical. Fortunately, other solutions are available including the use of enclosures to trap sounds emanating from the back side of the loudspeaker, and tuned ports to invert the phase of sound waves below a certain frequency. Without taking such measures, the interaction between sound waves between the front and back sides of the same loudspeaker causes uneven frequency response (i.e., some frequencies are emphasized more than others). This fundamental consideration is associated with any loudspeaker design whether it be a speakerphone or a high fidelity system. In speakerphones, however, acoustic leaks generally exist around its dial keypad, switches, jacks, and between top and bottom sections of its housing. The net result is that interference reduces low frequency output and creates "notches" in the frequency response at high frequencies—both of which diminish sound quality.

Speakerphones are faced with an additional problem in that the loudspeaker is generally located within the same housing as the microphone. Acoustic coupling between the loudspeaker and the microphone means that the distant party to a speakerphone conversation will experience a return echo whose annoyance is related to "round-trip" delay. In extreme cases, however, acoustic coupling between the loudspeaker and the microphone leads to oscillation. Accordingly, high performance speakerphones seeking full-duplex performance require that substantial attention be paid to the acoustic coupling between the loudspeaker and microphone.

U.S. Pat. No. 4,937,877 was issued on Jun. 26, 1990 to Pocock et al. and is entitled "Modular Microphone Assembly." Pocock seeks to isolate the microphone from the loudspeaker by enclosing a directional microphone capsule within a closed cavity of a hands-free telephone set. Both sides of the microphone's diaphragm are exposed to incoming sound waves through openings in the top surface of the telephone housing. Such exposure is required for directivity. However, applying this technique to a loudspeaker is not only impractical in telephone sets where there is rarely space for a dedicated structure; but also problematic, because the very features that enhance microphone directivity, degrade the frequency response of a non-directional loudspeaker.

SUMMARY OF THE INVENTION

In accordance with the invention, the frequency response of a loudspeaker, within an electronic equipment housing, is improved by enclosing it within a separate sealed enclosure. The equipment housing includes a printed wiring board with electronic components mounted thereon. The sealed enclosure is compactly formed by using the printed wiring board as one side of the enclosure, and a selected surface of the equipment housing as another side of the enclosure. The selected surface includes sound apertures which are isolated from the interior of the enclosure by the loudspeaker itself. Extending downwardly from the surface of the housing are sidewalls that surround the loudspeaker. A sealing material is used to join the sidewalls to the printed wiring board.

In an illustrative embodiment of the invention, the sealed enclosure is filled with an acoustically absorbent material such as foam or fiber which increases its effective acoustic volume thereby improving low frequency response. A compliant gasket is positioned between the sidewalls and the printed wiring board as the sealing material.

Additionally, in the illustrative embodiment, the loudspeaker is mounted in an "upwardly firing" direction between the cavities designed to accommodate the associated telephone handset. Such positioning leads to a particularly compact design.

Finally, in the illustrative embodiment, a tuned port is molded into the upper housing member which extends into the sealed enclosure. Its length and cross section area are selected to cooperate with the volume of the sealed enclosure to resonate in the region of the low cutoff frequency of the loudspeaker to further improve its frequency response.

BRIEF DESCRIPTION OF THE DRAWING

The invention and its mode of operation will be more clearly understood from the following detailed description when read with the appended drawing in which.

DETAILED DESCRIPTION

Speakerphones have grown in popularity in recent years, especially in the business environment where the convenience of hands-free communication has become more of a necessity than a luxury. Speakerphones allow the user to move around the office during a conversation and enable colleagues to join together for a conference call. The business user, however, exhibits little tolerance for low quality equipment and the sound quality of a speakerphone is readily apparent to its users. The ideal speakerphone is one that reproduces a distant party's voice with great fidelity (i.e., "naturalness") and enables full-duplex conversation (i.e., simultaneous conversation in two directions). Sound reproduction fidelity inherently requires that the loudspeaker provide an output sound level that is linearly proportional to its input signal level over the audible frequency range. In other words, all frequencies must receive equal treatment, and none are amplified or attenuated more than others. Furthermore, since the loudspeaker and a microphone generally share the same housing, the coupling between these transducers should be minimized to enhance the ability of the speakerphone circuits to provide full-duplex service. The present invention improves loudspeaker quality in such a manner that frequency response is improved at the same time that loudspeaker-to-microphone coupling is reduced.

Figure 1:
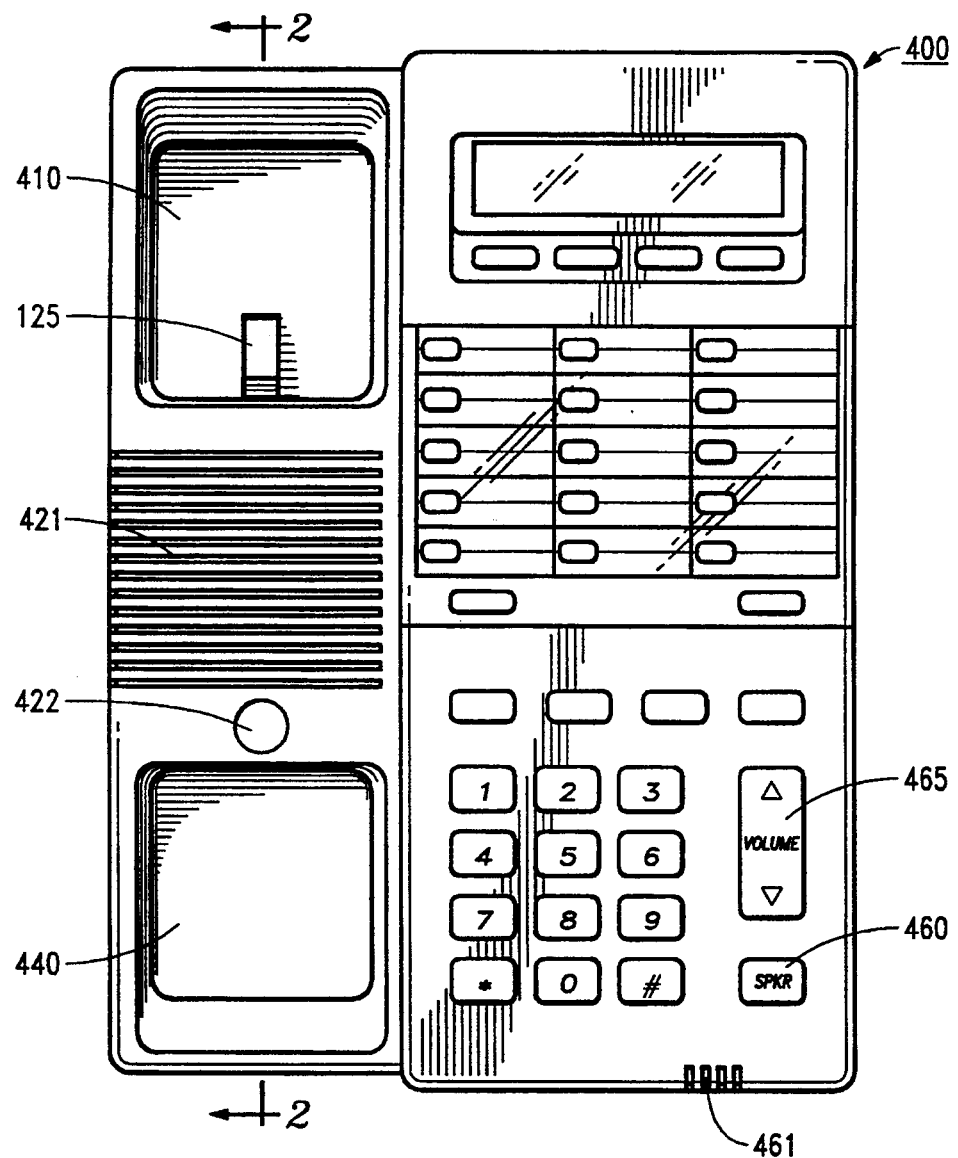
FIG. 1 is a top view of the exterior of a speakerphone adapted for use in the present invention.

FIG. 1 shows a top view of a speakerphone housing with its associated handset removed. Normally the receiver section of the handset fits into cavity 410 while the transmitter section of the handset fits into cavity 440. The user may enter the active (i.e., off-hook) state, in a speakerphone mode, by merely depressing SPEAKER key 460. The active state is alternatively selected by switchhook 125 when the receiver section of the handset is removed from cavity 410. During the speakerphone mode, the handset is not used. Instead, a microphone that is built into the housing (behind sound apertures 461) is used to pick up audible sounds. Additionally, a loudspeaker that is built into the housing (behind sound apertures 421) is used to broadcast audible sounds. The volume (loudness) of the loudspeaker is controlled by rocker switch 465.

The loudspeaker is mounted directly beneath apertures 421 on the inside surface of upper housing member 400. The loudspeaker is mounted in an "upwardly firing" direction between the handset-receiving cavities 410, 440. Sounds emanating from the front side of the loudspeaker easily pass through the apertures and into the air where they can be heard. These sounds are omnidirectional, which is to say that they radiate equally in all directions. It is noted that the back side of the loudspeaker generates a sound wave that is 180° out of phase with sound waves generated by the front side. Should these sound waves intermingle, they will interfere with each other. And while sound cancellation is particularly pronounced at low frequencies, cancellation and enhancement occurs at high frequences depending on the frequency and the particular location of the housing where sound (from the back side of the loudspeaker) is leaking. The net result is that the frequency response of the loudspeaker is degraded. Additionally, the sound waves from the back side of the loudspeaker propagate through the interior of the telephone station and are picked up by the microphone. Such coupling is undesirable because it can lead to oscillation in much the same way that loudspeaker systems do in large auditoriums, and which most people have experienced. However, even before oscillation occurs, the aforementioned coupling yields an echo that sounds to the distant party in a telephone conversation like he hears a delayed version of his speech through the receiver (i.e., very loud "sidetone"). This is generally undesirable.

Although sound waves from the back side of the loudspeaker generally cancel sound waves from its front side under uncontrolled conditions, it is possible to reverse the phase of the sound waves emanating from the back side of the loudspeaker in a selected frequency range to improve its overall frequency response. Tuned port 422 is used for this purpose as discussed hereinafter.

Heretofore, efforts to isolate unwanted sound waves from impinging on the microphone, particularly those coming from the loudspeaker, have focused primarily on the microphone housing itself (see e.g., U.S. Pat. No. 4,937,877); although, in some cases, improved isolation has resulted from the particular directivity (polar response) pattern of the microphone (see e.g., U.S. Pat. No. 4,885,773). The present invention provides such isolation in a different and novel manner that is most clearly shown in FIG. 2 which illustrates a cross sectional view of the speakerphone of FIG. 1 in the region where the loudspeaker is located.

Figure 2:
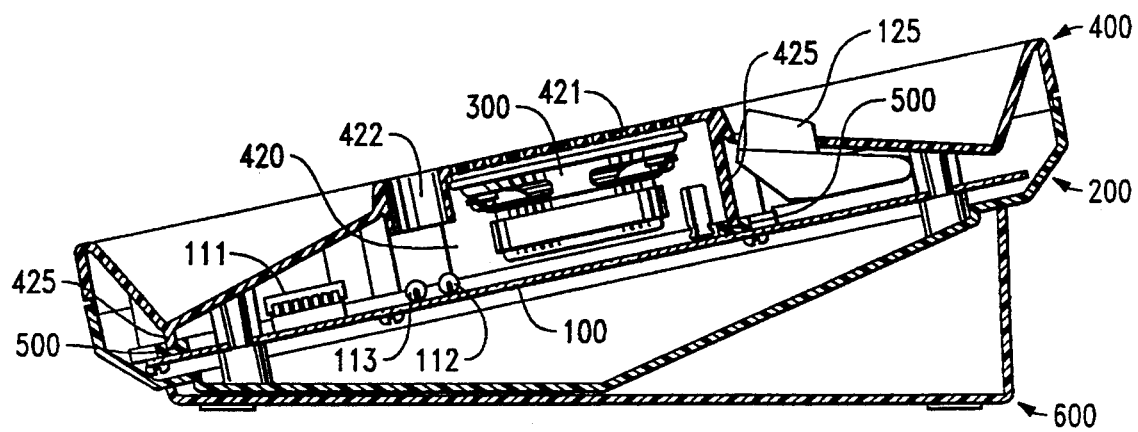
FIG. 2 is a sectional view of the speakerphone of FIG. 1 showing the sealed enclosure in which a loudspeaker is mounted.

FIG. 2 discloses the interior of a speakerphone comprising an upper housing member 400, lower housing member 200, and wedge-shaped pedestal 600 which places the speakerphone on an agreeable angle for desk-mounted use. Between the upper and lower housing members is a printed wiring board 100 which contains a plurality of electrical components 112, 113. A sealed enclosure 420 is created within the interior of the speakerphone that completely surrounds loudspeaker 300. The enclosure is bounded on its top side by the upper housing member 400 and on its bottom side by printed wiring board 100. Further, the enclosure 420 is surrounded on four lateral sides by sidewall 425 which is molded into the upper housing member. In order to form a seal between sidewall 425 and printed wiring board 100, a flexible gasket 500 is used. Advantageously, electrical components 112, 113 are located within the sealed enclosure and valuable space is not wasted. Sounds emanating from the front side of the loudspeaker 300 will pass through sound apertures 421 in the upper housing member, while sounds emanating from the back side of the loudspeaker will be contained within the sealed enclosure 420. Tuned port 422, however, allows sound waves within the enclosure to escape. In the preferred embodiment of the invention, the resonant frequency of the tuned port is 286 Hz—which is selected to be slightly below the low-frequency cutoff of the loudspeaker. Sound waves at frequencies close to resonance are phaseshifted and increased in magnitude such that the net effect of the tuned port is to lower the low-frequency cutoff of the loudspeaker. Sound waves above 286 Hz that emerge from the tuned port are attenuated at 12 dB per octave (thereby having little effect on the overall frequency response).

Figure 3:
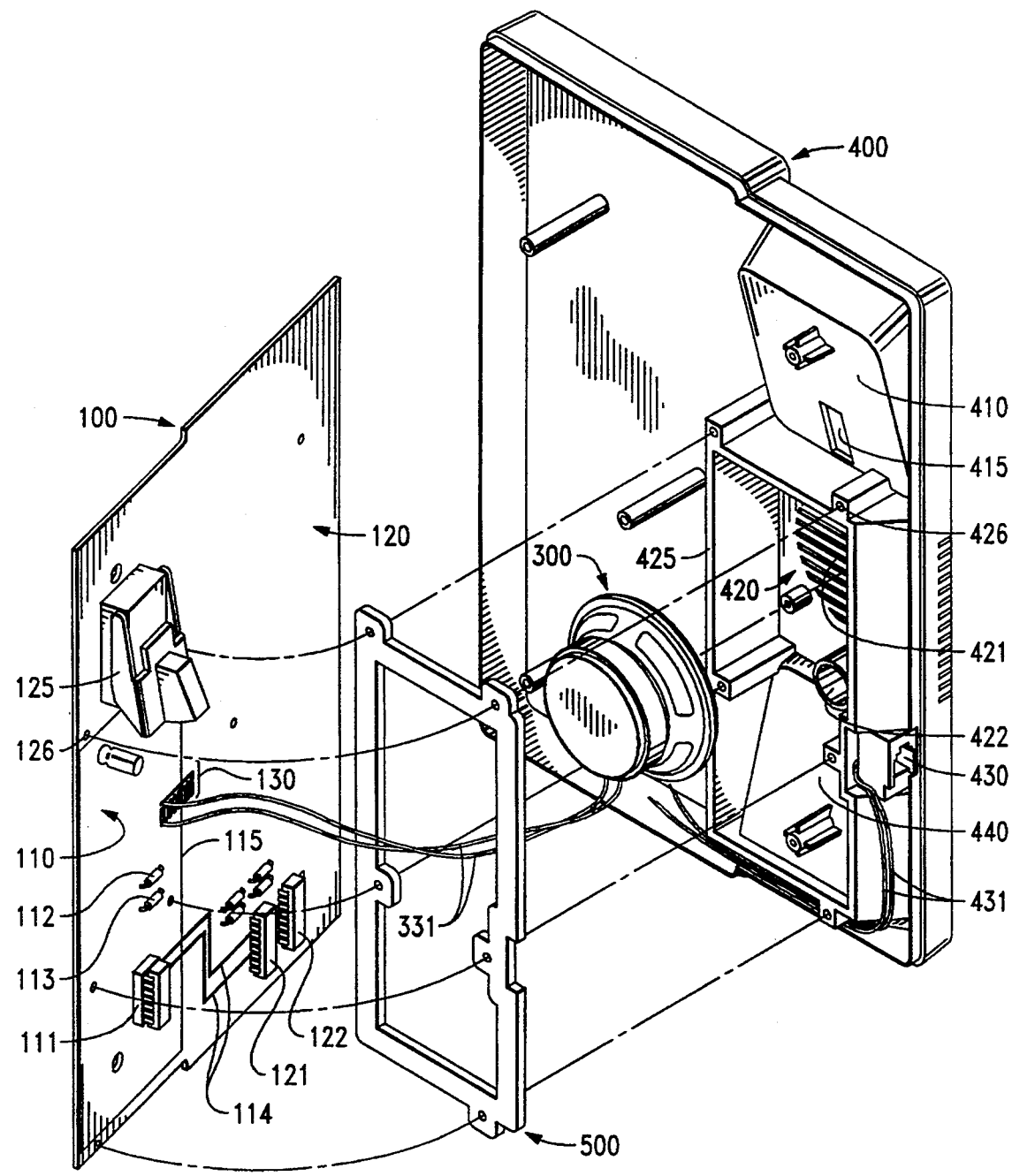
FIG. 3 discloses an exploded perspective view of the interior of the speakerphone shown in FIGS. 1 and 2.

FIG. 3 discloses an exploded perspective view of the interior of the speakerphone in accordance with the present invention. Loudspeaker 300 attaches to upper housing member 400 and fully covers sound apertures 421 which are molded into the upper housing member. As indicated, loudspeaker 300 fits into the sealed enclosure region 420 of the speakerphone in a compact manner. One of the handset-receiving cavities 440 is included in the enclosure to increase the volume of the enclosure. Handset-receiving cavity 410 is excluded because it has an opening 415 which is not completely sealed by switchhook 125 after the printed wiring board 100 is joined to the upper housing member 400. Printed wiring board 100 contains a large number of components needed to operate the speakerphone although only a few are shown. Perimeter 115 defines a region 110 of the printed wiring board which is within the sealed enclosure. Components 111–113 reside within the enclosure while, illustratively, components 121, 122 reside outside the sealed enclosure. It is desirable that there be no sound leaks from the enclosure; therefore, vias 130 should be sealed. Vias are holes that extend between opposite sides of the printed wiring board and are typically plated with solder so that they are electrically conductive. In addition to making electrical connections between opposite sides of the printed wiring board, vias are also used for receiving wires for making connections to electrical components that are not located on the printed wiring board. For example, wires 431 carry electrical signals to/from jack 430 on the side of upper housing member 400 are connected to the vias 130 that reside outside the enclosure; and wires 331 from loudspeaker 300 are connected to the vias 130 that reside within the enclosure. Gasket 500 is placed along the perimeter 115 of the sealed enclosure to seal against the printed wiring board 100 when the telephone set is assembled. In the preferred embodiment of the invention, the gasket 500 is a separate part that is made from EPDM (ethylene-propylene diene monomer), a terpolymer elastomer. Alternatively, the gasket may be made from other compliant materials such a silicone rubber or closed cell foam, and may be applied along the perimeter 115 to avoid the need for a separate part. Finally, a rigid material such as epoxy may be applied along the perimeter 115 during assembly to permanently join the sidewalls with the printed wiring board. In the final analysis, a seal needs to be created between the sidewalls and the printed wiring board. Because sidewall 425, molded into the upper housing member 400, makes contact with the printed wiring board only around perimeter 115, the perimeter should be free from components to facilitate the creation of the seal. Circuit traces 114, however, may cross the perimeter to connect components on both sides of the enclosure. Such traces only create small variations in height and are compensated for by the gasket 500.

Upper housing member 400 is molded from a thermoplastic material such as ABS resin (acrylonitrile-butadiene-styrene). In the preferred embodiment of the invention, the sidewalls 425 of the sealed enclosure 420 are molded into the upper housing member and are, essentially, cost-free. Loudspeaker 300 is mechanically attached to the upper housing member so as to cover sound apertures 421. To ensure good low frequency response, the sealed enclosure should be made as large as possible. Moreover, the enclosure may take on any shape since it simply acts as an acoustic compliance (i.e., an air spring). Ribs may be molded into the the enclosure to stiffen the sidewalls 425 and minimize mechanical resonances. Once the loudspeaker 300 is mounted in the enclosure 420, an acoustically absorbent material such as Hyfonic ™ open cell foam or Fiberglas ™ material is packed into the enclosure to increase its effective acoustic volume. This lowers the frequency of the low-end rolloff and damps the resonant peak that sometimes exists.

Low end frequency response is further improved by tuned port 422 which extends from the exterior of housing member 400 into sealed enclosure 420. Such designs are known as base reflex enclosures. The tuned port comprises an opening into the enclosure that has a predetermined cross section area "S" and a predetermined length "L". In cooperation with the volume of the sealed enclosure, the predetermined cross section area and length are selected to resonate in the region of the loudspeaker's low frequency cutoff and thereby move the low frequency response of the loudspeaker to an even lower frequency. In the preferred embodiment of the invention, the tuned port comprises a hollow tube which is molded into the upper housing member 400 along with sidewalls 425 and sound apertures 421. As discussed above, the tuned port phase shifts and enhances sound waves at frequencies close to its resonant frequency "$f_r$." And although a variety of shapes are possible, the following equation and illustrative dimensions are for a tuned port having a circular cross section:

$$f_r = \frac{C}{2\pi} \sqrt{\frac{S}{(L + 1.7a)V}}$$

where:

$f_r$ = resonant frequency of the tuned port = (286 Hz)
S = port cross section area = (0.196 square inches)
L = port length = (0.50 inches)
a = port radius = (0.25 inches)
V = volume of the sealed enclosure = (12 cubic inches)
C = speed of sound = (13,504 inches per second)

Tradeoffs may be made between port length, cross section area and enclosure volume while maintaining the same resonant frequency. Furthermore, the tuned port may comprise a plurality of smaller tuned ports, each having the same port length, but having smaller cross section areas that additively combine to equal the above port cross section area.

Opening 415 in the upper housing member allows switchhook 125 (mounted on the printed wiring board 100) to protrude through cavity 410. Since this opening is outside the sealed enclosure, it has no effect on frequency response. Opening 415 is illustrative of the variety of locations where leaks exist in speakerphone telephones that affect the frequency response. Finally, screw hole 126, in the printed wiring board, is aligned with boss 426 which is molded into the upper housing member 400 to facilitate joining them.

Figure 4:
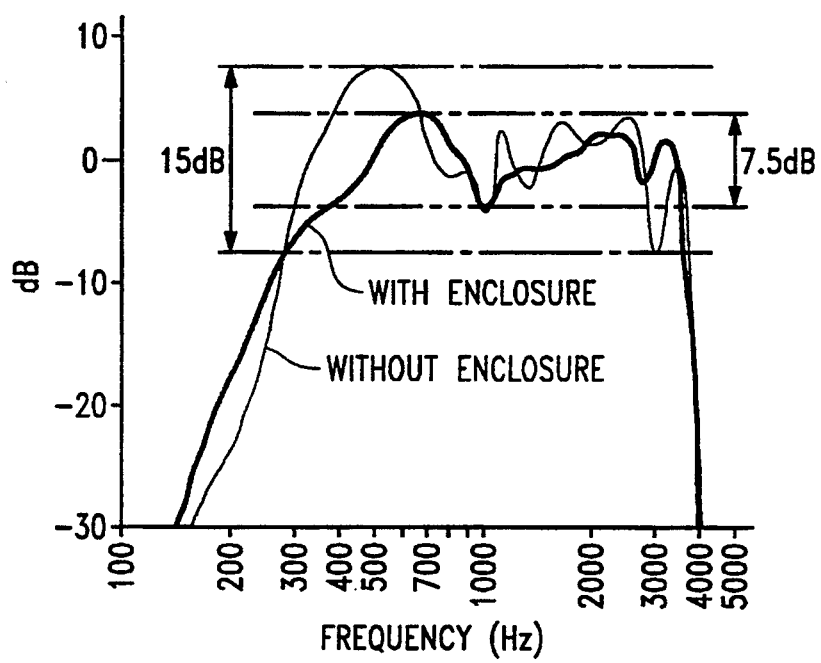
FIG. 4 shows plots of frequency response of a loudspeaker mounted in a speakerphone with and without the sealed enclosure of the present invention.

The improvement in frequency response provided by the present invention is illustrated by the graph of FIG. 4 which plots the relative output level (in dB) of the loudspeaker that results from a constant input level for frequencies in the audio frequency range. The effect of the tuned port is not included in this graph. Of particular interest is the reduced variation in the peaks and valleys of the the frequency response characteristic. Note that the 15 dB variation, without the sealed enclosure, is reduced to approximately 7.5 dB when the enclosure is present. Further, the sealed enclosure of the present invention provides a boost in the amplitude of the frequency response characteristic at its low end. Much emphasis is given to improving low frequency response because the typical solution is to use very large speakers and large enclosure volumes. In the present invention, low frequency response is enhanced by the use of the sealed enclosure and filler material within the enclosure. As discussed above, low frequency response is further enhanced by the use of a tuned port.

Figure 5:
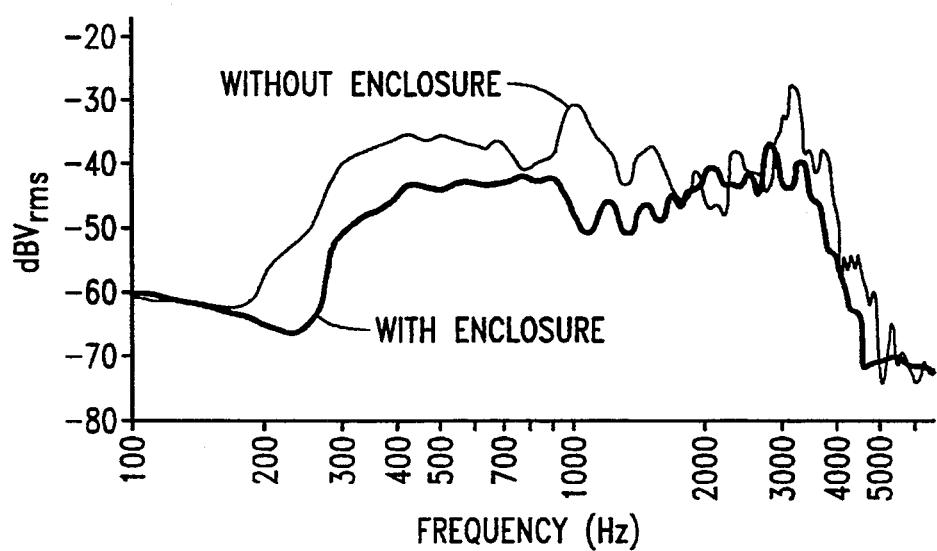
FIG. 5 shows plots of acoustic coupling as a function of frequency, between the loudspeaker and the microphone of a speakerphone with and without the sealed enclosure of the present invention.

The decrease in acoustic coupling between the loudspeaker and the microphone in a speakerphone is illustrated by the graph of FIG. 5 which plots the measured signal level (in dBV$_{rms}$) picked up by the microphone that results from a constant loudspeaker output level for frequencies in the audio frequency range. The effect of the tuned port is not included in this graph. Of particular interest is the decreased coupling at all frequencies, the improvement being nearly 20 dBV$_{rms}$ at some frequencies.

Although a particular embodiment of the invention has been shown and described, various modifications are possible within the spirit and scope of the invention. These modifications include, but are not limited to: loudspeakers that are oriented in a downwardly firing position; mounting the loudspeaker in a location other than between the handset-receiving cavities of a speakerphone; and the use of the invention in electronic equipment other than telephones.

We claim:

1. A compact loudspeaker assembly comprising a closed housing having a rigid surface that separates its interior and exterior regions, the rigid surface including a sound aperture therein for enabling the passage of sound waves, the interior region including a loudspeaker that is positioned to fully cover the aperture and a printed wiring board having electronic circuitry mounted on a surface thereof, the interior region further including an enclosure that separates the loudspeaker from the rest of the interior, said enclosure including a continuous sidewall having a bottom edge which is directly sealed to the printed wiring board surface, the enclosure having no opening into the interior region that would permit the passage of sound waves; whereby a sealed enclosure for the loudspeaker is compactly formed within the housing.

2. The compact loudspeaker assembly of claim 1 further including one or more tuned ports that extend from the exterior region of the closed housing into the sealed enclosure, the loudspeaker having a low cutoff frequency below which its output power drops sharply, said tuned port having a predetermined cross section area and a predetermined length selected to resonate at, approximately, the low cutoff frequency of the loudspeaker; whereby the low frequency response of the loudspeaker is improved.

3. The compact loudspeaker assembly of claim 1 wherein the loudspeaker is mounted between a pair of cavities designed to accommodate an associated telephone handset in a speakerphone telephone set.

4. The compact loudspeaker assembly of claim 1 wherein the closed housing comprises an upper housing member and a lower housing member of a speakerphone telephone set, said sidewall and the sound aperture being molded into the upper housing member.

5. The compact loudspeaker assembly of claim 1 wherein the sealing means comprises a compliant gasket positioned between the sidewall and the printed wiring board.

6. The compact loudspeaker assembly of claim 5 wherein the compliant gasket is made from Ethylene Propylene Diene Monomer material.

7. A loudspeaking telephone station comprising an upper housing member joined to a lower housing member, said housing members enclosing at least a loudspeaker, a microphone, and a printed wiring board comprising a generally planar surface having electronic components mounted thereon for controlling the telephone station; the loudspeaker being attached to the upper housing member directly beneath a plurality of sound apertures in the upper housing member and fully covering same,

CHARACTERIZED BY:

a continuous sidewall molded into the upper housing member and extending downwardly toward the lower housing member, said sidewall having a bottom edge which is directly sealed to the printed wiring board surface, said sidewall surrounding the loudspeaker on its lateral sides, but not surrounding the microphone, the sidewall forming a sealed enclosure that has no opening within the telephone station which would permit the passage of sounds between the loudspeaker and the microphone.

8. The loudspeaking telephone station of claim 7 further characterized by a tuned port comprising an opening in the upper housing member that extends downwardly toward the lower housing member for a predetermined length and is surrounded by the sidewall, said opening having a predetermined cross section area, the predetermined length and cross section area being selected to resonate in the region of low frequency cutoff of the loudspeaker; whereby the low frequency response of the loudspeaker is enhanced.

9. The loudspeaking telephone station of claim 7 wherein the sound apertures are located on the upper housing member between a pair of telephone handset-receiving cavities.

10. The loudspeaking telephone of claim 7 further including a compliant gasket interposed between the bottom edge of the sidewall and the printed wiring board.

11. Apparatus including an upper housing member joined to a lower housing member to form an interior volume which encloses electronic components on a printed wiring board surface, the upper housing member including (i) a sound aperture extending between its interior and exterior surfaces, (ii) a loudspeaker mounted to the interior surface so that it fully covers the aperture, and (iii) a continuous sidewall attached to the interior surface surrounding the loudspeaker; the apparatus being characterized in that the sidewall includes a bottom edge which is directly sealed to the printed wiring board surface by means of compliant material interposed therebetween, the separate chamber having no opening into the interior volume that would permit the passage of sounds therethrough; whereby a sealed chamber containing the loudspeaker is formed in a compact manner.

12. The apparatus of claim 11 wherein the upper housing member further includes a second sound aperture extending between its interior and exterior surfaces, said interior volume further enclosing a microphone which is responsive to sounds entering the second sound aperture so that the apparatus being used for transmitting and receiving sounds.

13. The apparatus of claim 12 wherein the upper housing member further includes a third sound aperture extending downwardly into a separate chamber for a predetermined length, said third sound aperture having a predetermined cross section area, the loudspeaker having a low cutoff frequency below which its output power drops sharply, the predetermined length and cross section area being selected to resonate in the region of low frequency cutoff of the loudspeaker.

* * * * *